H. HANSON.
TYPE WRITING AND COMPUTING MACHINE.
APPLICATION FILED APR. 12, 1912.
1,279,107.
Patented Sept. 17, 1918.
8 SHEETS—SHEET 6.
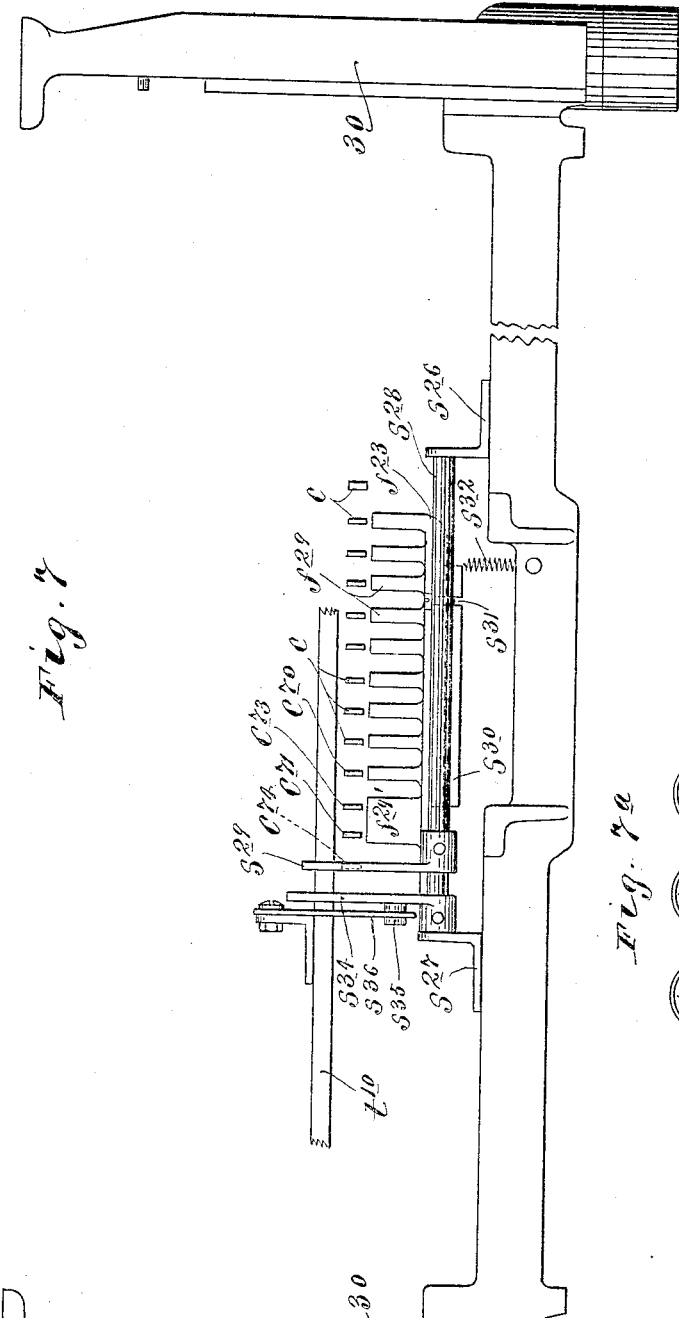
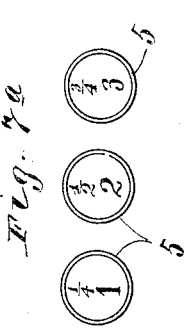

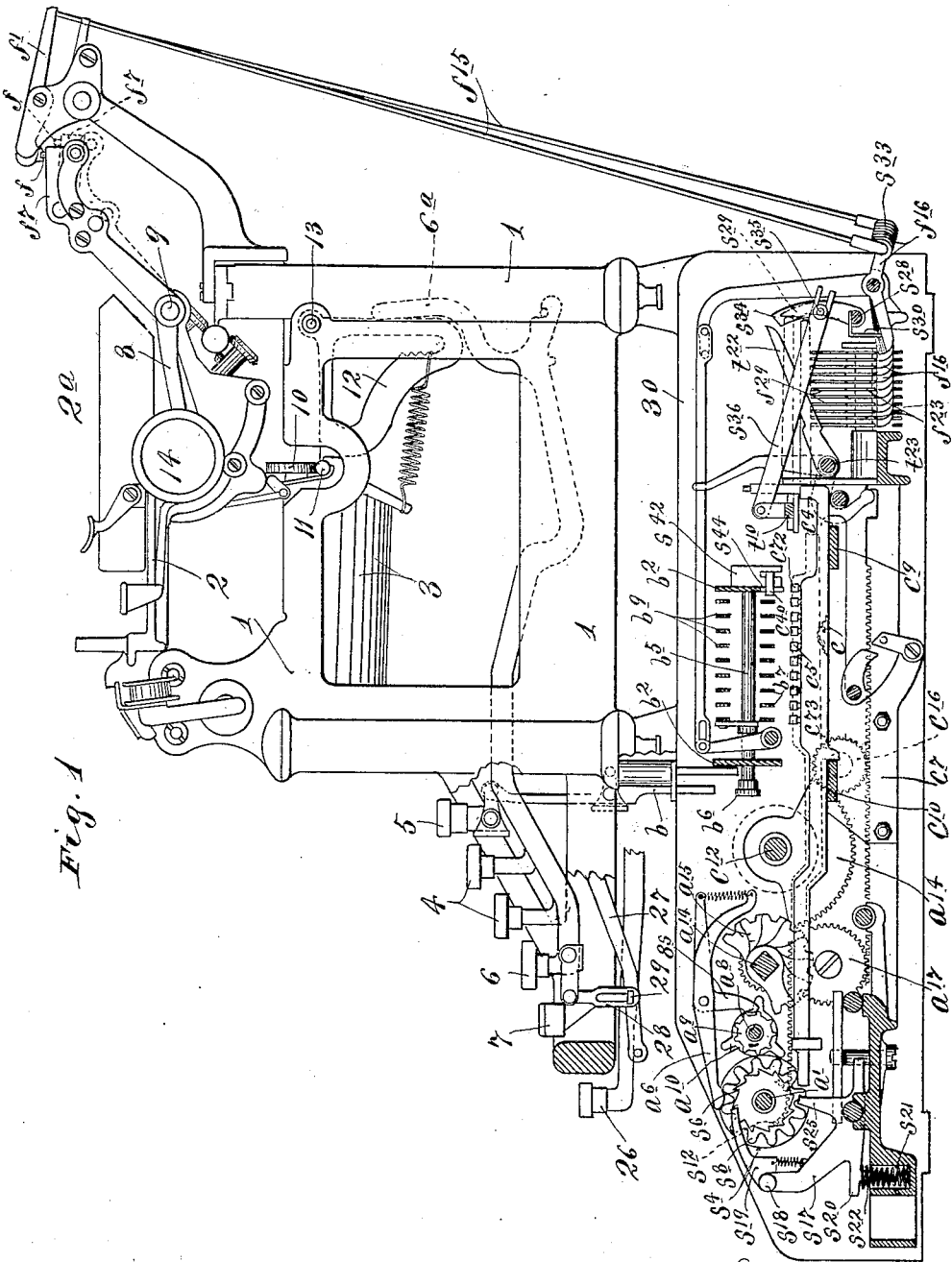

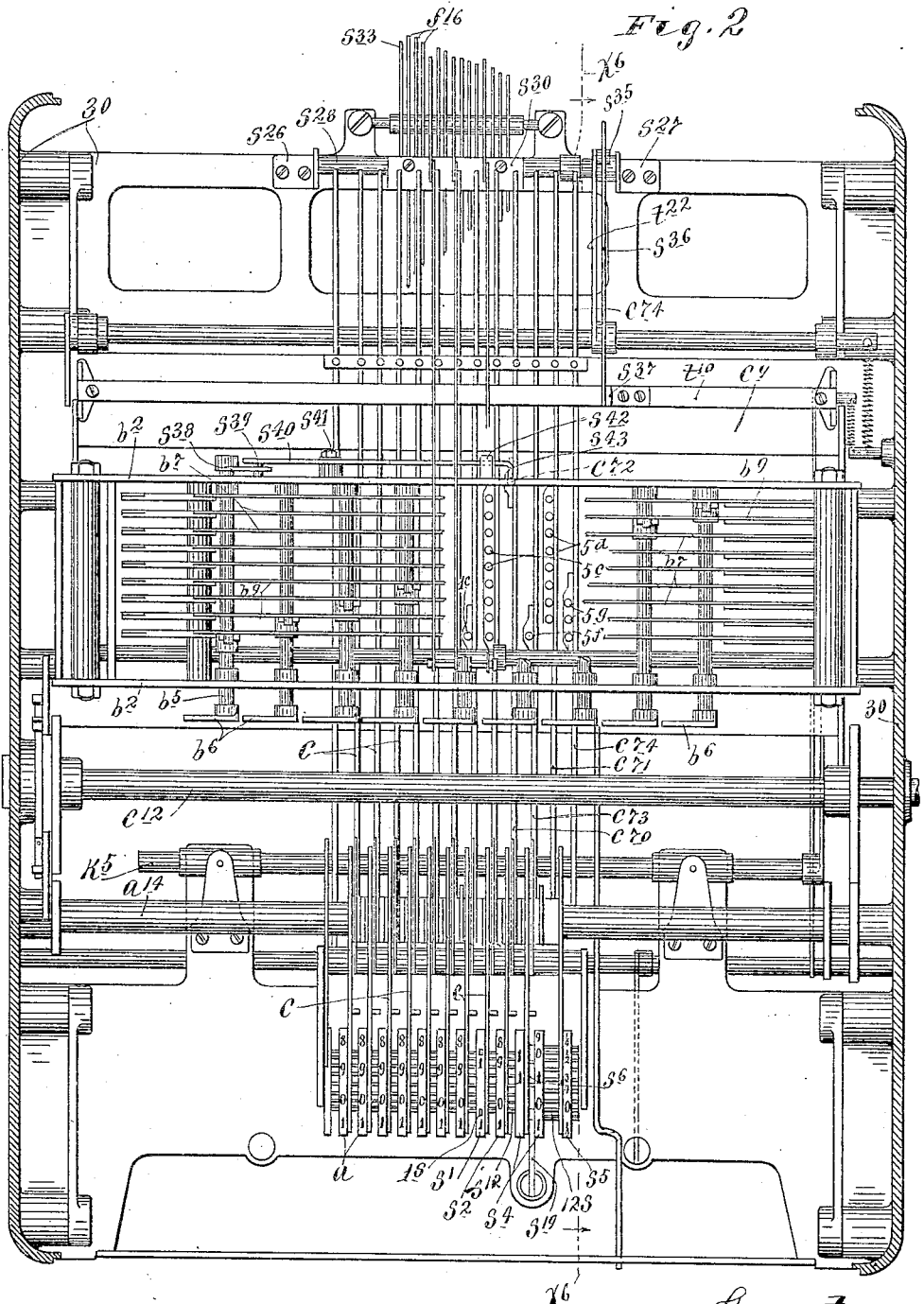

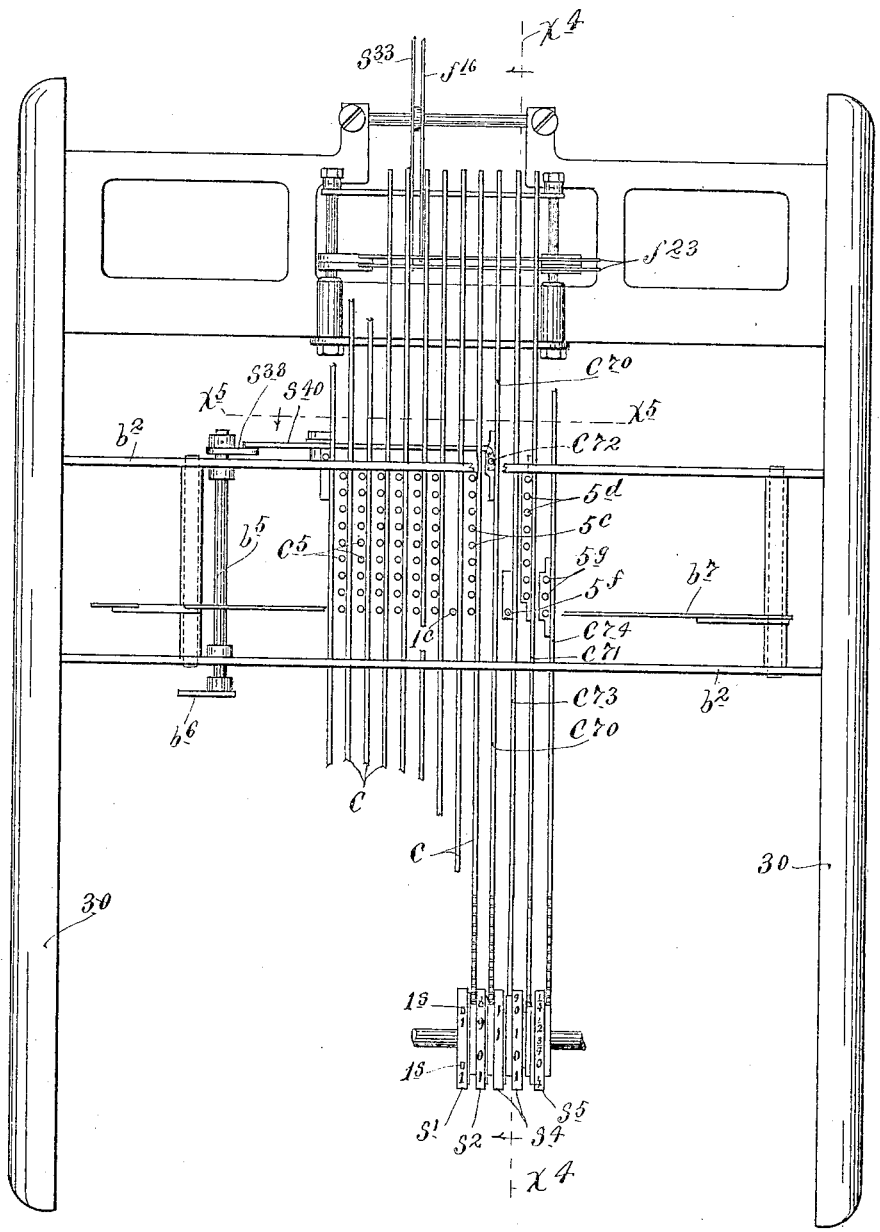

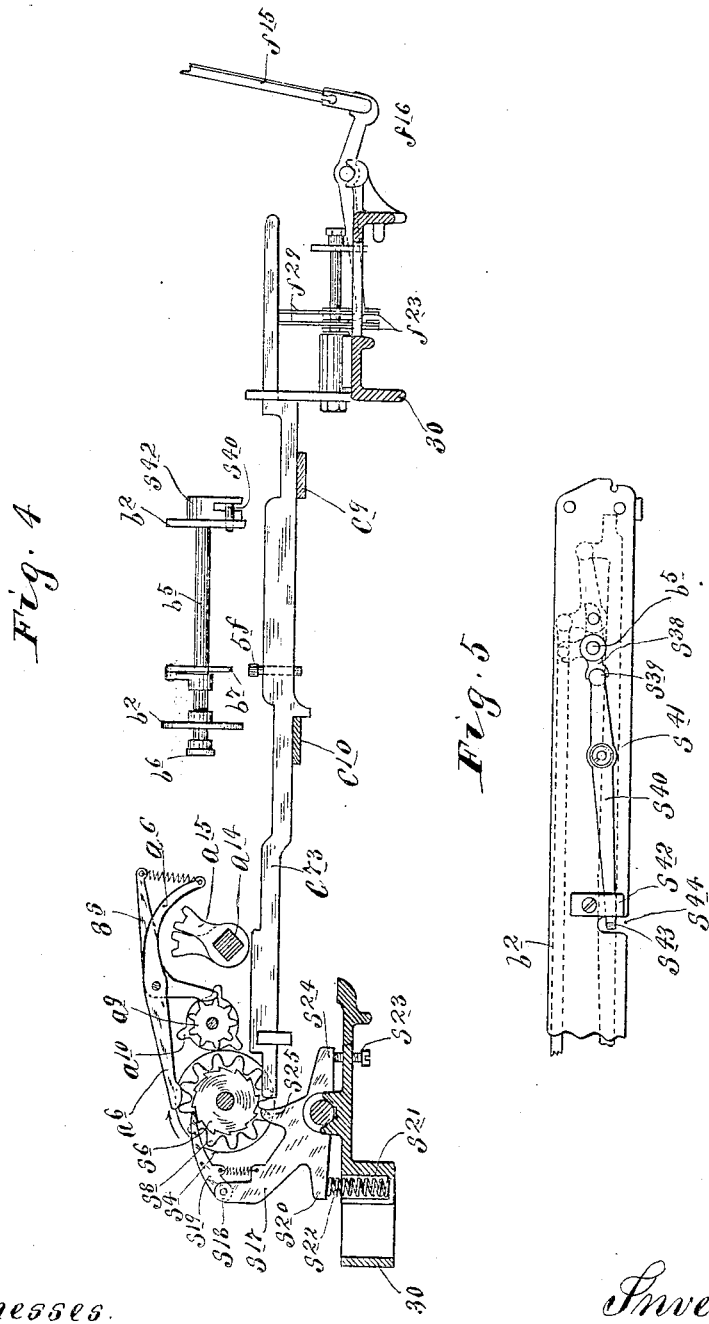

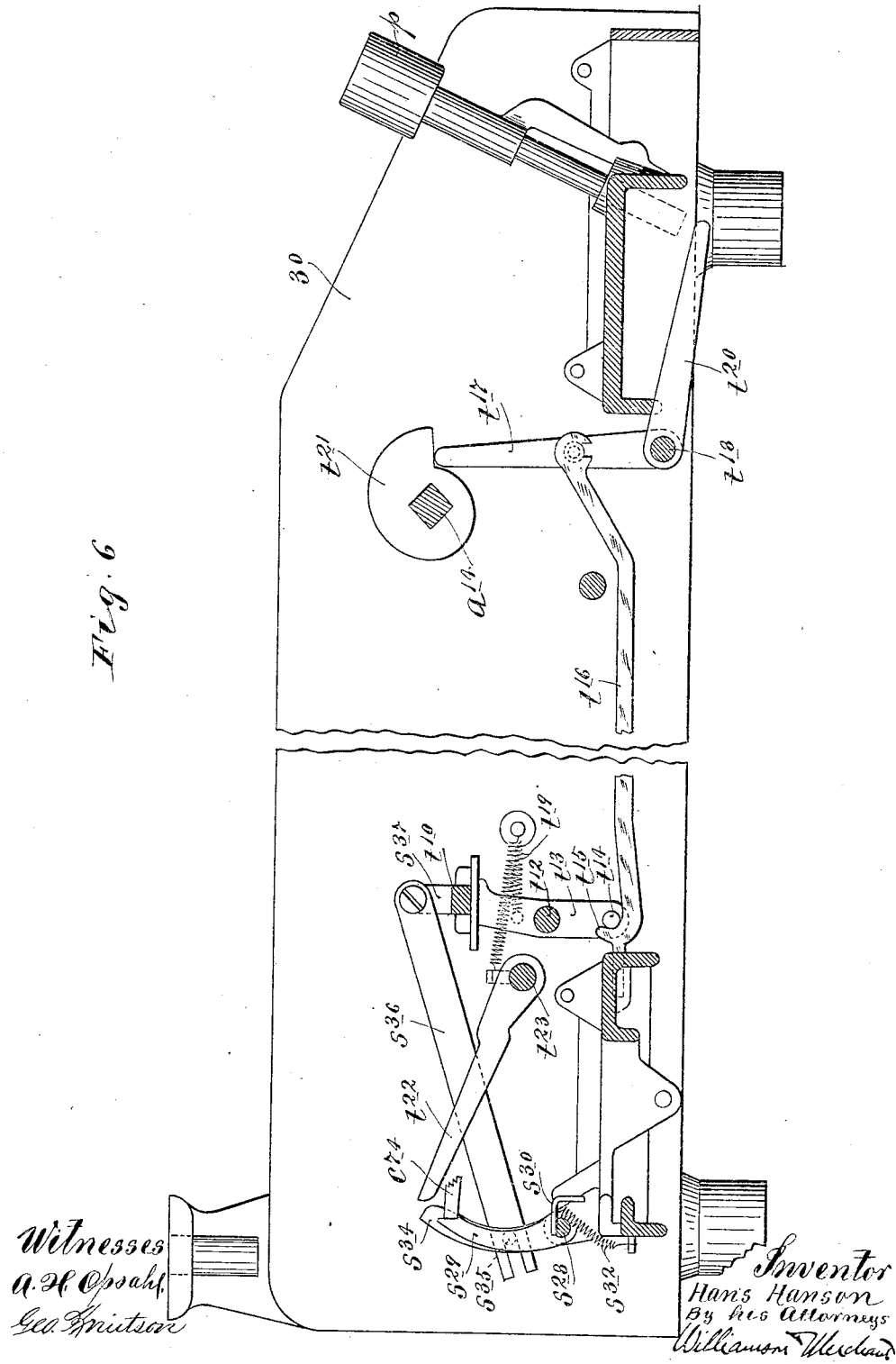

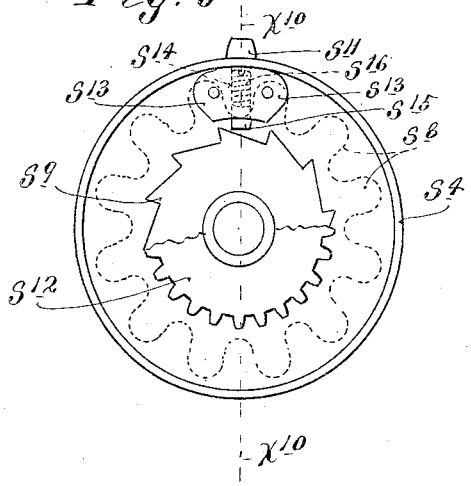
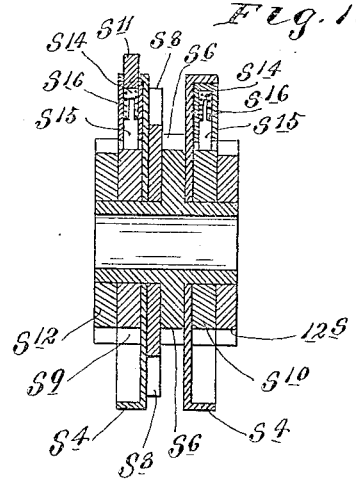
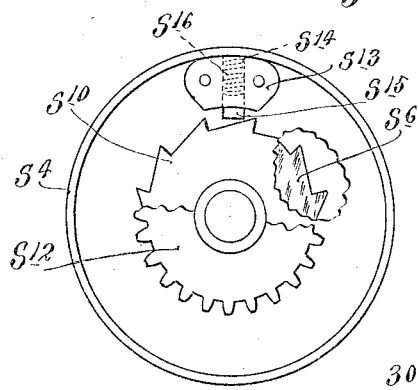
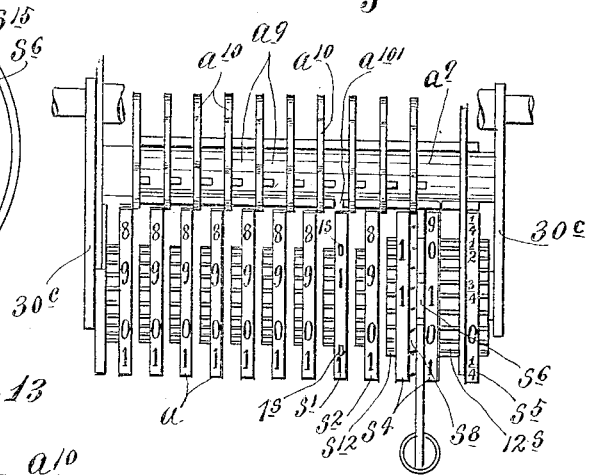
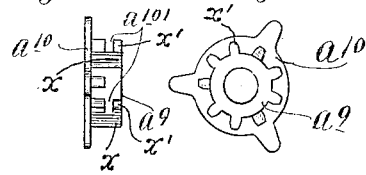

H. HANSON.
TYPE WRITING AND COMPUTING MACHINE.
APPLICATION FILED APR. 12, 1912.

1,279,107.

Patented Sept. 17, 1918.
8 SHEETS—SHEET 8.

Witnesses.
Arthur A. Johnson
John Waldheim

Inventor.
Hans Hanson
by O. B. Stickney
Attorney.

UNITED STATES PATENT OFFICE.

HANS HANSON, OF HARTFORD, CONNECTICUT, ASSIGNOR, BY MESNE ASSIGNMENTS, TO UNDERWOOD COMPUTING MACHINE COMPANY, OF NEW YORK, N. Y., A CORPORATION OF NEW YORK.

TYPE-WRITING AND COMPUTING MACHINE.

1,279,107.

Specification of Letters Patent.

Patented Sept. 17, 1918.

Application filed April 12, 1912. Serial No. 690,281.

*To all whom it may concern:*

Be it known that I, HANS HANSON, a citizen of the United States, residing at Hartford, in the county of Hartford and State of Connecticut, have invented certain new and useful Improvements in Type-Writing and Computing Machines; and I do hereby declare the following to be a full, clear, and exact description of the invention, such as will enable others skilled in the art to which it appertains to make and use the same.

My present invention relates to combined typewriting and computing machines of the general character disclosed and claimed in my prior Patents 816,319 of date March 27th, 1906, 905,421 and 905,422, both of date December 1st, 1908, and also in the patent to Frederick A. Hart, No. 1,190,171, dated July 4, 1916, all entitled "Combined typewriting and computing machines."

In my said prior Patents 816,319 and 905,421, the computer mechanism includes a set or row of computer keys that are distinct from and additional to the numeral keys of the typewriter. In my said prior Patent 905,422, a highly important feature of improvement was made by dispensing with the separate row of computer keys and employing the numeral keys of the typewriter to operate the computer. This improvement not only simplified the mechanism but very greatly improved the action of the machine, in many respects fully set forth in the said latter noted patent.

The Hart invention disclosed in his said patent above identified, was designed as an improvement on or refinement of the combined typewriter and computing machines of the type disclosed and broadly claimed in my prior U. S. Letters Patent 816,319, 905,421, and 905,422, above more fully identified. The machine of the said Hart patent also employs the numeral keys of the typewriter as the operating keys of the computer, in this respect, following my said prior Patent 905,422.

The said Hart patent is directed, among other things, to the improvement of the so-called decimal order selecting mechanism of my said prior machines and involves quite different construction thereof, resulting in material improvement thereon.

My present improved machine follows very closely and in many respects is identical with the construction disclosed and claimed in the said Hart patent, and maintains the important feature of my said prior Patent 905,422, to-wit, the use of the numeral keys of the typewriter as the operating keys of the computing mechanism, but involves such important features of improvement or novel re-arrangement of certain parts of the machine as will adapt the machine to the English monetary system.

As is well known, the English monetary system is not a decimal system and is computed thus:

4 farthings_____ 1 penny.
12 pence _____ 1 shilling.
20 shillings_____ 1 pound sterling.

In prior machines designed to add or compute in accordance with the English monetary system, at least two and usually three different keys have been required to register 1, 10 and 11: In my improved machine, I use but a single key for the registration of 1, 10 and 11 pence, and in the preferred arrangement wherein the invention is incorporated in the combined typewriter and computing machine and the numeral keys of the typewriter key-board are employed as the operating keys of the computer, I have no extra key or keys, but use the typewriting numeral key marked "1" for making the different registrations above noted. Furthermore, this single key is used exactly in the manner it is used in writing the different amounts, and this, as is obvious, very greatly simplifies the keyboard action and avoids confusion.

In carrying out this feature of my invention, I provide the pence wheel with three actuating members, all acting directly on said wheel and all under the control of the "1" key.

Another feature of my invention relates to a modification of the carrying mechanism associated with the tens of shillings wheel, whereby, with slight changes in the construction, the usual form of zero-setting devices may be retained.

Another feature of my invention relates to the means for enabling fractions of pence, or farthings, to be printed as common fractions and computed as such, under control of the same numeral keys as are used for printing and computing digits. In the present instance, I place the fractions 1/4, 1/2 and 3/4 on the numeral keys 1, 2 and 3, respectively, although, as will be seen, the particular keys used for this purpose are not material.

Hereinafter, comparison will be made only between the present improved so-called "English Model" machine and the machine disclosed in the said prior Hart patent, and in the detailed description which will hereinafter follow, all of those parts which, in the present application and in the Hart patent, are identical, or substantially so, are designated by the same characters. Hence, if further description of one of the common elements or groups of elements herein briefly given is desired, it may be readily found by reference to the specification of said Hart patent.

It may be here further stated that the typewriter; the so-called "decimal order selecting mechanism;" the latter's connection to the typewriter, the unit pin-equipped register bars or preliminary representation devices; the unit bars for setting the unit pins; the latter's connection to the numeral keys of the typewriter; and the operating carriage and associated parts including an operating crank, are identical, or substantially identical with corresponding parts of the machine of the said Hart patent. Various other devices such as error correcting devices, zero devices, unit pin restoring devices, punctuating space key locking mechanism, and certain safety devices, all clearly described in the said Hart patent, may be employed in the present machine, either in their identical form or in any desirably modified or improved form, not necessary for the purposes of this case to consider.

In many respects, the register, including the carrying mechanism employed in the present application, is very similar to that of the said Hart patent; but certain important modifications thereof, have been found necessary, all as will be hereinafter fully disclosed.

In my prior patents, and in the said Hart patent, the registers therein disclosed comprise a group of decimal order digit-bearing wheels. For each register, there is a series of so-called register bars, to-wit, one for each register wheel, except the register wheel of the highest order. These register bars extend from front to rear of the machine and each bar carries a series of vertically movable so-called unit pins.

The unit bars are, through suitable connections, depressed by the corresponding numeral keys of the typewriter. The rear ends of the register bars are raised in their proper order of succession by a decimal order selecting mechanism, and the latter is actuated by the typewriter carriage.

When the register bars stand in normal positions, their unit pins stand directly under corresponding overlying unit bars, but lie far enough below the same so that the depression of said unit bars will not engage the respective unit pins, unless the rear portions of said register bars are raised by a so-called decimal order selecting member, in which case, however, the depression of any unit bar will force downward into a "set" position the corresponding unit pin of such raised bar.

In the Hart patent above referred to, the type for the numeral keys are arranged in lower case. When the case is shifted to print upper-case characters, the decimal-order-selecting member is rendered ineffective, so that in such machine there can be no set-up on the unit pins by the numeral keys when printing in upper case. In the machine of my present invention, however, the type 1/4, 1/2 and 3/4 for printing fractions of pence are upper-case characters, and I provide for the setting of digit pins on the fractions of pence register bar, by these keys, notwithstanding the fact the decimal-order-selecting member is ineffective during the case-shifting operation. This I accomplish by latching the register bar associated with the fractions of pence order in its raised position, but further arrange to trip said bar when the typewriter carriage is positioned in other denominational orders. Said register bar is also arranged to be tripped when correcting an error in the setting of the unit pins, and also during the completion of the computation on the register wheels.

Register bars in which unit pins have been set are moved forward and rendered operative on the register wheels, by the movement of a so-called operating carriage or general operator, and the movements of the latter are controlled by a so-called operating crank, through suitable intermediate connections.

Other features and advantages will hereinafter appear.

In the accompanying drawings which illustrate the present invention, like characters indicate like parts throughout the several views. Referring to the drawings, Figure 1 is a view partly in diagrammatic side elevation and partly in vertical section showing the combined typewriting and computing machine embodying my invention, some parts being removed;

Fig. 2 is a plan view with some parts sectioned and with some parts broken away, showing the computing mechanism which is contained in the base section of the machine;

Fig. 3 is a somewhat similar view to Fig. 2, but with very many of the parts removed;

Fig. 4 is a vertical section taken approximately on the line $x^4\ x^4$ on Fig. 3, some parts being removed;

Fig. 5 is a detail view in rear elevation showing the parts located in the vicinity of the line marked $x^5$ $x^5$ on Fig. 3;

Fig. 6 is a section taken approximately on the line $x^6$ $x^6$ on Fig. 2, some parts being removed and some parts being broken away;

Fig. 7 is a fragmentary view in rear elevation showing certain parts of the computing mechanism;

Fig. 7ª is a fragmentary plan of certain of the numeral keys;

Figs. 8 and 9 are detail views in side elevation showing the two elements of the so-called pence register wheel;

Fig. 10 is a vertical section taken through the pence register wheel on the line $x^{10}$ $x^{10}$ on Figs. 8 and 9;

Fig. 11 is a fragmentary plan view of certain parts of the register shown in Fig. 1; and Figs. 12 and 13 are views, respectively, in plan and elevation of one of the register carrying wheels.

Figure 14:
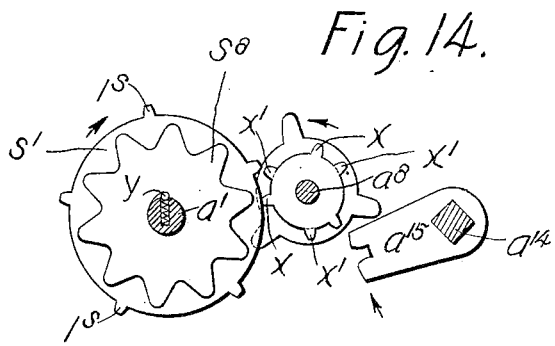

Fig. 14 is a view showing the tens of shillings wheel with its associated carrying mechanism, the parts being shown in their normal positions.

Figure 15:
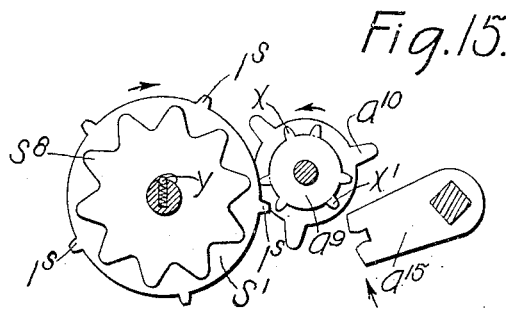

Fig. 15 is a view of the same parts, but in different relative positions, the tens of shillings wheel having been turned a distance sufficient to initially set its associated carrying pinion.

Figure 16:
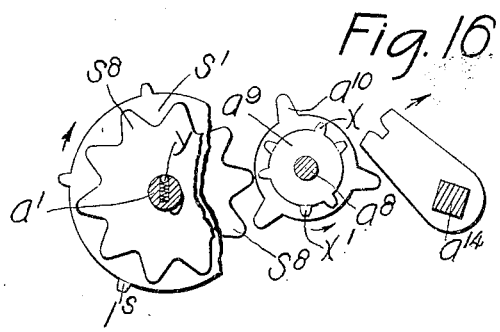

Fig. 16 is a view of the parts shown in Fig. 14, after the carrying gears have moved the carrying pinion from the position shown in Fig. 15.

The typewriter illustrated is a No. 5 Underwood, the construction and operation of which is well known. Hence, for the purposes of this case, the parts of this typewriter will be identified only to an extent which will make clear the relation of the typewriting mechanism to the computing mechanism.

Directing attention particularly to Fig. 1, the numeral 1 represents the typewriter frame, the numeral 2 the typewriter carriage, the numeral 3 the type bars, the numeral 4 the character keys, the numeral 5 the numeral keys, the numeral 6 the shift keys, and the numeral 7 the spacing bar.

The typewriter carriage 2 has a vertically movable supplemental frame 2ª that is held for parallel movements by arms 8 connected to a rock shaft 9 mounted in suitable bearings on said carriage. Said carriage has the customary wheel 10 that runs upon a guide rod 11 connected for parallel movements by a pair of spring-pressed bell crank levers 12 secured to a rock shaft 13, which, in turn, is journaled in suitable bearings on the sides of the typewriter frame 1. The platen or paper supporting roller 14 is carried in the usual way by the supplemental frame 2ª.

Upwardly extended rear portions 6ª of the shift keys 6 engage the backs of the bell cranks 12, so that when either one of the shift keys is depressed, the rod 11 will be raised, thereby lifting up the supplemental frame 2ª with its roller 14, so as to thereby present the printing surface of the paper on the roller, to the upper case letters of the type bars.

The numeral 26 indicates upwardly spring-pressed tabulating keys, (see Fig. 1) which operate in the usual way to release the typewriter carriage, for tabulating purposes. The usual key-actuated intercepting bars, not shown, coöperate with the tabulating stops, not shown, to intercept movements of the typewriter carriage in the tabulating action.

All parts of the typewriter so far described are found on the No. 5 Underwood typewriter equipped with tabulating mechanism, and for the further purposes of this case, it is desirable to state that the depression of any tabulating key 26 will depress also one of the shift keys 6 (as shown, the right hand shift key), while the depression of the said shift key will not depress any of the tabulating keys. This is accomplished by means of a spring-pressed bail 27 pivotally connected to the typewriter frame 1 with its transverse free portion underlying all of said tabulating keys 26, and by a link 28 pivotally connected to an extension of the said right hand shift key 6, and having a slot that is engaged by the head of a stud 29 on one side of said bail 27.

The mechanism for adding pounds sterling (£) may be and is assumed to be identical with or similar to that used for ordinary numbers, which mechanism is disclosed in my said prior Patent 905,421, and in the Hart patent, above noted.

The mechanism for registering shillings is different, however, and in order to make the proper registration thereof, I use two register wheels $s^1$ and $s^2$, respectively, for tens and units of shillings. The wheel $s^2$ is similar to the wheels for registering pounds, but wheel $s^1$ is different on its face, having the numeral 1 in five different places and having no other numerals or characters whatever, and having also five projecting lugs 1ˢ or teeth for displacing the carrying wheel $a^9$, whenever the amount on the said two wheels equals or exceeds the sum of twenty shillings, or one pound, so as to thereby transfer the twenty shillings to the unit member of wheels for pounds, when the register is actuated. The numeral notation 1 on the said wheel $s^1$ and also the carrying lugs 1ˢ, are spaced equidistant circumferentially of said wheel. While the construction of the said shillings wheels $s^1$ and $s^2$, per se, is old and well known to those familiar with this art, a part of the carrying mechanism associated with the tens of shillings wheel is modified to preserve the general form of zero-setting mechanism used in this type of machine, which type is particularly set forth in my Patent No. 905,421, already referred to.

The carrying wheels $a^9$, except the one which "carries over" from tens of shillings to units of pounds, are, in principle, the same as shown in Patent No. 816,319, or No. 905,421, but for purposes of manufacturing, the nine-toothed and six-toothed gears are made as one of sufficient width, with nine teeth at first, and afterward, every third tooth is partially cut away laterally, Fig. 12, so that the portion nearest to the three-toothed wheel $a^{10}$, has nine teeth, between which the carrying wheel retaining pawl finds lodgment and holds said wheel against accidental movements; the portion farthest away from the three-toothed wheel has only six teeth. This makes the wheels, in effect, and the functions thereof, the same as described in the above identified patents.

The construction and general mode of operation of the carrying mechanism associated with the tens of shillings wheel is illustrated in Figs. 14, 15 and 16. With the parts positioned as in Fig. 14, it will be clear that any carrying lug $1^s$ will engage between a pair of teeth $x$, $x'$, on the carrying wheel $a^9$, and move the same to the position shown in Fig. 15, where the carrying lug $1^s$ is shown as having just passed the lower tooth $x$ of the pair of teeth. The movement of all of the register wheels in the direction of the arrow takes place on the forward movement of the register bars $c$.

During the return of the register bars, the carrying gears $a^{15}$ are rotated, and if any carrying wheel $a^9$ has been displaced to the position shown in Fig. 15, such carrying wheel is in position to be engaged by one of the carrying gears $a^{15}$ and to be turned by said carrying gears from the position shown in Fig. 15 to the position shown in Fig. 16. During such turning of the carrying wheel, one of the three teeth thereon engages a tooth of the pinion $s^8$ associated with the wheel of next higher order. In Fig. 16 the pinion $s^8$, shown behind the broken portion of the wheel $s^1$, is associated with the units of pounds wheel, so that for each fifth of a rotation of the tens of shillings wheel, the units of pounds wheel is driven one unit of movement. In resetting the register wheels to zero, the shaft $a^1$ is given a complete rotation. This may be done in the manner specifically set forth in my said Patent No. 905,421. The shaft carries spring-pressed balls $y$ forming clutches which engage the register wheels, and, as the shaft rotates, the balls thereof will encounter all the several adding wheels and move them to positions such that the units order wheel stands at normal, while those of higher orders stand one step short of normal. The complete movement of the higher order wheels is effected by the tens-carrying mechanism. It will be noted, however, that in the case of the tens of shillings wheel, if said wheel has been moved to such a position that more than one of its carrying lugs $1^s$ would pass any given place during the rotation of the shaft $a^1$, then, if there were no means to prevent it, the carrying wheel $a^9$ would be turned more than the distance from the Fig. 14 position to the Fig. 15 position, and therefore the carrying mechanism, in completing the zero-setting operation, might, in some cases, fail to act on said carrying wheel associated with the tens of shillings order, and thus give a wrong indication at the reading line of the register.

The wheel for "carrying over" from the tens-wheel of shillings to the units of pounds wheel, is therefore slightly different, due to the fact that the tens-wheel for shillings $s^1$, as pointed out above has more than one carrying tooth, or lug, $1^s$, on its face. When the register is "cleared" prior to starting new work, as above set forth said wheel $s^1$ will be rotated a longer or shorter distance, depending on its position relatively to the means for setting the register wheels at zero, (0, or blank space) and for the purpose of preventing the wheel $a^9$ being operated on by more than one tooth $1^s$ on wheel $s^1$ no matter to what extent the latter is rotated, a notch, or slot, $a^{101}$, is cut in every second of the six long teeth, through which teeth $1^s$, on wheel $s^1$, may pass. Normally, one of the long non-mutilated teeth, as for instance that tooth indicated at $x$, Fig. 14, is in such position that the tooth $1^s$, on wheel $s^1$, nearest to it will encounter and displace said long tooth, and bring the slotted tooth, $x^1$, to occupy the position of the former, whenever wheel $s^1$ is rotated, and if said wheel is rotated far enough to make more than one of its teeth $1^s$, pass any given point, said teeth will pass through the slot $a^{101}$, leaving the carrying wheel $a^9$ in proper position to be operated on by its coöperating segment $a^{15}$, to complete the "carrying over" process.

As there are twelve pence to a shilling, the wheel for adding pence is provided with twelve divisions, or units, from 0 to 11, on its periphery, or two more units than a wheel for adding pounds, and, provision is made for making the pence wheel rotate as many spaces, from 1 to 11 inclusive, as are required, and with a single numeral key, operated in the ordinary manner of typewriting, said pence wheel will automatically register 1, 10 and 11, as the case may be, thereby relieving the operator from special operations when either 10 or 11 pence are to be added.

Farthings are treated as fractions of pence, thus 10 1/4 d., but a separate wheel is provided for same and will be more fully described hereinafter.

By reference to the machine of said Hart patent, and to the drawings of the present application, it will be seen that rods $f^{15}$ are the connecting medium, or part of such medium, between the typewriter carriage and the preliminary representation devices of the adding mechanism. Describing or reviewing these connections more in detail, it will be noted that the so-called selector block $f^7$ is carried by an extension on the typewriter carriage and supports a small dog $f$, designated as the "selector". When the carriage moves from right toward the left, this selector $f$ passes under the front ends of the selecting levers $f^1$, forcing the rear ends thereof downward and pressing rods $f^{15}$ downward, which, in turn, depress the rear ends of levers $f^{16}$ forcing their forward ends upward against the coöperating so-called transposing bars $f^{23}$.

Extending upward from the said bars $f^{23}$ are lugs $f^{29}$ which are located directly under the rear ends of the corresponding register bars $c$, for lifting up the latter in proper order of succession, when selector $f$ passes under the levers $f^1$, and thus presenting the said register bars $c$, or rather the unit pins $c^5$ thereof, to the overlying transversely extended unit bars $b^7$, one after the other in an order of succession from left toward the right. The register bar for operating the units wheel for shillings has nine longitudinally spaced pins $5^c$.

One of the said lugs, to-wit, the one marked $f^{29\prime}$ is of sufficient width to lift two register bars marked $c^{71}$ and $c^{73}$, at the same time (see Fig. 7). The purpose of this will be fully set forth hereinafter.

The register bar $c$, operating the tens wheel for shillings, has only one unit pin $1^c$ which is located in line with the front transverse row of unit pins for adding pounds.

The improved mechanism for registering pence includes register wheels $s^4$ and $s^5$, each having twelve divisions on its periphery. Hence, the gear wheels, hereinafter noted, which are mounted on the hubs of the said wheels $s^4$ and $s^5$ and mesh with the racks on the ends of coöperating register bars, are larger in diameter than the gears on all of the other wheels of the register. This is done so that if the front row of unit pins be "set" in all of the register bars, the wheels adding pounds and shillings, when the operating carriage is moved forward and backward, will be given one-tenth of a rotation, but the pence wheel and farthings, or fractions of pence wheel, will be given only one-twelfth of a rotation. In other words, the difference in diameter of the gears on the pence wheels, and the number of teeth thereon is two-twelfths, or one-sixth more than in the gears on the other register wheels. By this improved arrangement, the register bars are all given equal movements when the corresponding pins are set, but with the resulting variation in the rotation imparted to the wheels $s^4$ and $s^5$ on one hand and the decimal order register wheels which are assigned to pounds and shillings.

The register wheel $s^4$ is preferably formed with a double rim or face and with the numerals 0 to 11, inclusive, thereon, and with one carrying tooth $s^{11}$ projecting from the periphery of the left hand rim. Between the two rims is located a twelve-toothed ratchet wheel $s^6$ rigid on the hub of the said rims. Also, on the hub of the said rims is a twelve-toothed wheel $s^8$, which latter serves as a friction disk that is acted upon by a spring-pressed retaining pawl $a^6$. The twelve-toothed wheel $s^8$ also is operated on by that carrying wheel which co-acts with the farthings wheel $s^5$. The said parts $s^4$, $s^6$, $s^8$ and $s^{11}$ are all connected for uniform rotary movements and the common hub extends beyond the outer sides of both rims, so as to permit the mounting thereon of two gears $s^{12}$ and $12^s$. The gears $s^{12}$ and $12^s$, respectively, mesh with the teeth of the register bars $c^{70}$ and $c^{71}$. Attached to the gears $s^{12}$ and $12^s$, for uniform movements therewith, are two twelve-toothed ratchet wheels $s^9$ and $s^{10}$, respectively. The carrying tooth $s^{11}$, above noted, has a flange or body portion $s^{13}$ riveted to the web of the rims $s^4$, the said tooth projecting through a hole in said rim. The body $s^{13}$ has a hole $s^{14}$ in which is located a small pin $s^{15}$, the upper end of which is reduced and is subject to a spring $s^{16}$ that constantly forces the end of said pin against the ratchet wheel $s^9$.

When the register bar $c^{70}$ is moved forward, the gear wheel $s^{12}$ and ratchet wheel $s^9$ are caused to move in the direction of the arrow marked on Fig. 4, and when a tooth of the said ratchet wheel $s^9$ comes against the pin $s^{15}$, the wheel $s^4$ and attached parts $s^6$ and $s^8$ are caused to move in the same direction. When, however, the said register bar moves backward, the pin $s^{15}$ is cammed outward, by the ratchet tooth and slides over the teeth of the said ratchet wheel $s^9$, permitting the wheel $s^4$ to remain stationary.

The right hand rim $s^4$ is also provided with a carrying tooth body $s^{13}$, pin $s^{15}$ and spring $s^{16}$, but the tooth $s^{11}$ is omitted or cut off just under the rim $s^4$. The ratchet wheel $s^{10}$ is similar to the ratchet wheel $s^9$. The gear wheel $12^s$ is in mesh with the rack on register bar $c^{71}$ and operated thereby. The means for imparting motion to the other register wheels, by the respective register bars, is identical to that illustrated in Fig. 8.

I have already mentioned a register bar $c^{70}$, which, as shown in Figs. 2 and 3, has only one units pin $c^{72}$, located one space to the rear of the rearmost line, or row of units pins in the other bars. This bar $c^{70}$ coöperates with gear wheel $s^{12}$ and ratchet wheel $s^3$ to impart motion to the pence wheel $s^4$, and when its pin is "set" it will always cause said wheel to rotate ten spaces, or effect a registration of 10 thereon. Register bar $c^{71}$ has only eight units pins $5^d$, representing the numerals 2 to 9, inclusive, when printed in the units column of pence and coöperates with gear wheel $12^s$ and ratchet wheel $s^{10}$, on the right hand side of the double rimmed wheel $s^4$, and causes a registration on said wheel from 2 to 9, according to which units pin may be set. The parts viewed, as in Fig. 8, turn in a direction reverse from that of the movements of the hands of a clock, while the said parts, as shown in Fig. 9, rotate in the direction of the movement of the hands of a clock.

In order to cause a registration of 1, a third bar $c^{73}$ is provided, and this bar, as best shown in Figs. 2 and 4, is of different construction. This bar $c^{73}$, has no toothed rack on its forward end, such as the other bars have. As shown in Fig. 1, it is located in the plane of ratchet wheel $s^6$, and adapted to move a short distance forward and back below said ratchet wheel without touching the same. Located below and in front of the pence wheel is a four-armed lever $s^{17}$, in the upper forward end of which is fulcrumed at $s^{18}$ the spring-held pawl $s^{19}$, the free end of which rests on a tooth of ratchet wheel $s^6$. Lever $s^{17}$ has a lower forwardly extending arm $s^{20}$ with a prong extending downward into a recessed portion, or socket, $s^{21}$ in the forward side of the front bottom frame, in which is located a spiral spring $s^{22}$, the upper portion of which encircles the prong or arm $s^{20}$ and lifts said arm upward. To regulate the distance the spring $s^{22}$ may move pawl $s^{19}$ on the upper forward arm of lever $s^{17}$, a set screw $s^{23}$ is located in the bottom frame under the rear end $s^{24}$ of lever $s^{17}$. In a vertical line from the fulcrum of lever $s^{17}$ is another arm $s^{25}$ which lies in the direct path of the reduced forward end of register bar $c^{73}$. As shown in Figs. 2 and 4, said bar $c^{73}$ has only one units pin $5^t$ located in line with the front row of units pins in the other bars, representing the numeral 1, and causing a registration of 1 on the pence wheel $s^4$, when "set" under the action of numeral key 1. When bar $c^{73}$ moves forward, its forward end comes against arm $s^{25}$ of lever $s^{17}$, pushing the same toward the front of the machine far enough to permit the free end of pawl $s^{19}$ to fall in behind the tooth of ratchet wheel $s^6$ on which it normally rests, and when said bar $c^{73}$ moves backward, the spring $s^{22}$ causes lever $s^{17}$ to move toward the register wheel, and pawl $s^{19}$ pushes the wheel $s^4$ one space, thereby causing a registration of 1 on said wheel.

It may here be noted that the forward ends of the friction pawls $a^6$ for wheels $s^4$ and $s^5$ are a trifle longer than the other pawls, due to the variation in spacing the teeth on their friction disks $s^8$.

The fractional pence wheel $s^5$ is similar in construction to the wheels for £, with such modifications as its functions require. It has three carrying teeth and three groups of figures, 0, 1/4, 1/2, and 3/4, thereon, or twelve divisions in all; the same as the pence wheel $s^4$. It might have had only four or eight divisions, but for the sake of uniformity in size of wheels and coöperating register bars the present division is preferred.

The carrying wheel co-acting with said wheel $s^5$, it is here noted, is much wider than the others in order that it may reach over and operate on gear $s^3$ of the pence wheel.

The register bar $c^{74}$ operating the wheel $s^5$ has only three units pins $5^g$, because said wheel never needs to be rotated more than three spaces for registration purposes, a fourth impulse always completing the registration of a penny, through the transfer of 1 to the pence wheel $s^4$ by the carrying devices.

Having described the construction of the shillings and pence registering wheels and their operating register bars, I will now explain the means whereby it is possible to use the numeral keys 1, 2 and 3 in the upper case so as to print the fractions 1/4, 1/2 and 3/4 on the paper, and register them on the farthings wheel $s^5$.

The key-lever for case-shift key 6, has, as before noted, an upwardly extending arm $6^a$ at the rear end thereof that is close to one arm of a bell crank lever 12. The other arm of said lever 12 supports a rail 11, on which runs a roller 10, of the platen supporting frame, which latter is fulcrumed at 9, and to the fulcrum rod 9 is attached the extension of the selector block supporting frame. If you depress one of shift keys 6, the platen, through the means just described, is raised up, so that the printing point comes opposite the part of the type block having the upper case character, which in the case of the numeral keys 1, 2 and 3, are the fractions referred to above. This lifting up of the platen, however, has an opposite effect on the selector block $f^7$, which is lowered to a position shown by dotted lines in Fig. 1, in which position, it will be seen that selector $f$ is far below selecting lever $f^{12}$, consequently, said lever causes no depression of rod $f^{15}$, with the result that the register bars are left in their normal positions. There is only one column in the adding zone, to-wit, that for farthings, where fractions are required to be printed. The means employed for holding register bar $c^{74}$, operating farthings wheel $s^5$, in the elevated position shown in dotted lines, in Fig. 1, presenting the units pins in said bar to the action of setting bars $b^7$ while the platen is held in the upper case position, are as follows: On the rear end of the bottom frame of the adding machine are two L-shaped brackets $s^{26}$ and $s^{27}$, supporting a rock shaft $s^{28}$, on which is mounted a curved latch-arm $s^{29}$, the forward side of which rests against the rear end of register $c^{74}$ when the latter is in its normal position, as shown in full lines in said Fig. 1. On top of said rock shaft $s^{28}$, and attached thereto, is a flat rocking blade $s^{30}$ extending forward a little and then bent downward so that the lower edge is not far from the upper side of forward ends of levers $f^{16}$, and as said levers do not have their upper sides in a horizontal line at the point where the lower edge of said blade crosses them, the downward bent portion is a little wider at one end than the other in order that the distance between levers $f^{16}$ and said rocking blade may be as nearly equal as possible.

In said downward bent rocking-blade, near its left hand end, is a slot $s^{31}$ which is directly above the path of that lever $f^{16}$, which, when operated, causes register bar $c^{74}$ to be elevated, permitting that particular lever to be depressed by the selector $f$ and connecting rod $f^{15}$, without coming in contact with blades $s^{30}$, but all of the other levers $f^{16}$, when operated, strike against the lower edge of the blade and rock it. To the left hand end of the rocking blade $s^{30}$, one end of a spring $s^{32}$, Fig. 6, is attached and the other end is suitably attached to the bottom frame. This spring holds latch-arm $s^{29}$ constantly against register bar $c^{74}$, when in normal position, and when it is raised to the position shown in dotted lines in Fig. 1, latch arm $s^{29}$, under stress of spring $s^{32}$, snaps in under the rear end of said bar $c^{74}$ and holds it in that position.

The type-block connected to, and operated by the numeral keys representing 1, 2 and 3, are provided with the upper case characters 1/4, 1/2 and 3/4, respectively, and the finger pieces of said keys are properly marked, indicating their respective lower and upper characters, as shown in Fig. 7ª, and as there is no connection between the case-shift keys 6 and latch arm $s^{29}$, it is evident that the register bar $c^{74}$ will remain in its elevated position when the case-shift key is depressed, so that an upper case character 1/4, 1/2 or 3/4 may be printed by the operation of the proper key, and at the same time, the pin, in said register bar, representing the fraction printed, will be set by the setting bar $b^7$ connected to the key operated.

Any lever $f^{16}$, except the one working in slot $s^{31}$, will strike against the edge of rocking-blade $s^{30}$, rocking the shaft $s^{28}$, thereby forcing backward the upper end of latch-arm $s^{29}$, letting register bar $c^{74}$ fall down to normal position. Thus, it will be seen that the rocking-blade $s^{30}$ is a safety device for preventing bar $c^{74}$ from being in a raised position at the same time that any other register bar is in position to have a units pin set therein. To the left of lever $f^{16}$, coöperating with bar $c^{74}$, is one more lever, $s^{33}$, connected by a rod $f^{15}$ to a lever $f^1$, the same as lever $f^{16}$, the forward end of which is shorter than the others and not connected with any of the transposing bars $f^{23}$, and the function of which is to strike against the rocking-blade $s^{30}$ and thereby automatically release latch-arm $s^{29}$ from register bar $c^{74}$ when the typewriter carriage escapes one step after printing a fractional number in the farthings column.

As it is not always necessary to print anything in the farthings column, and as register bar $c^{74}$ is lifted up immediately after the imprint in the pence units column, it is necessary to release said bar $c^{74}$ from its raised position by other means than lever $s^{33}$. For instance, the operator may want to correct an error at the moment bar $c^{74}$ is in its raised position, but unless said bar is lowered the error key $p$ cannot be depressed because the shoulder $c^4$ of the raised register bar is in such position that the transverse bar $t^{10}$ cannot pass over it. All the other register bars will fall down when the carriage is in such position that selector $f$ is not in contact with levers $f^1$, but bar $c^{74}$ may be held in its raised position by latch-arm $s^{29}$, no matter in what position the typewriter carriage may be. The means for releasing said bar $c^{74}$ from latch-arm $s^{29}$ by depressing the error key, are best shown in Fig. 6, in which the rear end of said bar is shown in its raised position and resting in the upper notched end of latch-arm $s^{29}$.

The lower end of error key $p$, when depressed, comes in contact with a lever $t^{20}$, rigidly attached to a rock-shaft $t^{18}$. $t^{17}$ is another lever also fast on rock-shaft $t^{18}$. On lever $t^{17}$ is a shoulder headed pin to receive the forward end of a link $t^{16}$, the rear end of which rests in a hole in the forward portion of the rear bottom frame. Near the rear end, said link has a curved portion forming a hook $t^{15}$ adjacent to a pin $t^{14}$ at the lower end of a lever $t^{13}$, attached to the shaft $t^{12}$. In the upper end of lever $t^{13}$ is fastened the transverse bar $t^{10}$, the other end of which rests in a similar support on the opposite end of shaft $t^{12}$. Lever $t^{13}$ is held in the position shown by the spring $t^{19}$, which forces pin $t^{14}$ against hook $t^{15}$ on link $t^{16}$ until it rests against the bottom frame.

A little to the rear of shaft $t^{12}$ is another shaft $t^{23}$, on which is located an arm $t^{22}$, the free end of which is cam-shaped. On rock-shaft $s^{28}$, located on the right of and close to latch-arm $s^{29}$, is another curved arm $s^{34}$, which has a headed pin $s^{35}$ on its right hand side, embraced by the forked end of a link $s^{36}$, the other end of which is suitably attached to the upper end of an L-shaped bracket $s^{37}$ attached to the top of the transverse bar $t^{10}$. When error key $p$ is depressed, link $t^{16}$ is drawn forward, the upper end of lever $t^{13}$ is thrown rearward and through link $s^{36}$, arm $s^{34}$ is also forced backward, rocking the shaft $s^{28}$ and latch-arm $s^{29}$, so that its free end is disengaged from rear end of bar $c^{74}$, which immediately falls down permitting transverse bar $t^{10}$ to move backward over the shoulder $c^4$ of said bar $c^{74}$. Said transverse bar $t^{10}$ serves to hold all the register bars down firmly while the pin restoring platform, underlying all the units pins, is forcing "set" units pins back to their normal positions, under the action of the error key, or when the handle of the adding machine is operated, and the operating carriage is moved.

The arm $t^{22}$ on shaft $t^{23}$ also operates on arm $s^{34}$ to rock latch-arm $s^{29}$ so as to release registed bar $c^{74}$ whenever the last item printed happens to be in the pence units column and the handle of the adding machine is operated to transfer the amount printed to the register. As this arm $t^{22}$ has other functions to perform, fully disclosed in the Hart patent above identified, I do not consider it necessary to further describe its operating connections.

The means for causing the pence wheel $s^4$ to register the various amounts of 1, 10 and 11 by the operation of one single key, (the numeral key 5 bearing the numeral 1) have been partially described, but there are a few parts not yet mentioned.

In Figs. 1, 2 and 3, the setting frame $b^2$ with its units pin setting mechanism is shown. When the numeral key 5 bearing the numeral "1" is depressed, its downwardly depending link $b$, strikes its connecting arm $b^6$, rocking the shaft $b^5$, and thereby forcing down the units setting bar $b^7$ connected to rock shaft $b^5$, setting the most forward units pin, representing 1, in any register bar that may be in a raised position. At the rear end of said shaft $b^5$ is an arm $s^{38}$, rigidly attached to said shaft, and the free end of which is forked and embraces a pin $s^{39}$ in one end of a lever $s^{40}$, fulcrumed at $s^{41}$ on a stud pin in the rear wall of the setting frame $b^2$. The other end of said lever works in a guide block $s^{42}$ attached to the rear wall of the setting frame. The free end of said lever is bent at $s^{43}$, so as to come under the rear wall of setting frame $b^2$, which has a slot $s^{44}$ in its lower edge permitting the free end of lever $s^{40}$ to work therein. The free end of said lever $s^{40}$ lies directly above units pin $c^{72}$ in register bar $c^{70}$, so that when said register bar is in a raised position and the numeral key representing 1 is depressed, the lever $s^{40}$ will set said pin $c^{72}$. As there is no other pin in said bar the setting bar $b^7$, which is operated by the said key, performs no function with regard to this bar $c^{70}$.

This register bar $c^{70}$ coöperates with pence wheel $s^4$ and the pin $c^{72}$ represents tens of pence, consequently, when 1 is printed on the paper, with the bar $c^{70}$ in raised position, said 1 appears in the tens column for pence, and the pin $c^{72}$ being located one space in the rear of the units pins, representing 9, in the other register bars, it is easily understood that the bar $c^{70}$, when moved forward by the connections with the operating handle, will rotate pence wheel $s^4$ ten spaces, registering 10 on its face. After operating key 1, if 10 is the amount desired to be printed, the zero (0) key is depressed to print the naught, and as said key has no connection with the adding or registering devices, its action has no effect on the latter, but the amount is printed in the proper place on the paper.

Under the heading "operation" I will explain how the registrations of 1 and 11 are effected.

*Operation.*

So far as the adding of £ is concerned, the operation is substantially the same as in the prior machines, above noted, and I will begin by illustrating the manner of adding together shillings of the amounts—

5s.
6s.
11s.

Total_____ 1. 2 or 1£ 2 shillings.

Assuming that all register wheels are at zero at the sight opening, we will now add 5. The typewriter carriage is positioned so that selector $f$ is under that selector lever $f^1$ which represents units of shillings, the rear end of lever $f^1$ depresses its corresponding rod $f^{15}$ and lower lever $f^{16}$, the latter causing the rear end of the register bar, actuating the units shillings wheel $s^2$, to be raised up. The numeral key representing 5 is now depressed, printing 5 on the paper, and "setting" the units pin representing 5 in the raised register bar. The operating handle is now oscillated and the numeral 5 appears on the said wheel $s^2$, all the other wheels still showing 0 or a blank space. We will now add 6 more. The typewriter carriage must be positioned as before, as to column, but the printing point, of course, must be below that of the previous imprint, when the numeral key representing 6 is struck, printing 6 under the 5, and setting the units pin representing 6 in the same register bar as before. The handle is again oscillated and 6 is transferred to register wheel $s^2$, which will rotate the wheel one space beyond the 0, so that "1" will appear on said wheel at the sight opening. As the said wheel passes from 9 to 0 at the sight opening, the carrying tooth displaces its co-acting carrying wheel and on the backward movement of the handle, said carrying wheel rotates the tens wheel $s^1$ one space, whereby the numeral 1 appears on said wheel at the sight opening. We now have the numeral 1 appearing on both the shillings wheels, which, together read 11, which is the total of 5 and 6 added together. So far, the action is similar to that of adding £ or dollars. We will now add 11 more. This time the typewriter carriage is positioned one step to the right of its previous positions, in order that the figures may be printed in their respective columns. The numeral key representing 1 is now depressed twice in succession, setting the 1 pins in the two register bars actuating wheels $s^1$ and $s^2$. The handle is again oscillated, transferring 1 to each of said wheels, each of which already displays the numeral 1. When the handle has completed its movement and is back to normal position, the numeral 2 will appear on wheel $s^2$, and a blank space will appear on wheel $s^1$. While the latter rotates one space, from 1 to blank, one of its five carrying teeth operates its co-acting carrying wheel and when the handle moves backward, said carrying wheel transfers 1 to the next higher decimal order, which is the units of £, and on the units wheel of which now appears the numeral 1, so that when the total is read it appears as

| 1 | | 2 | or 1£ 2s.

It is here noted that the register bar for wheel $s^1$ has only one units pin, representing 1; as there are 20s. to one £, no higher amount than 1 can ever be properly printed in the tens column of shillings, because any higher amount in that column represents 1£ or more, and by having only one pin in that bar, the machine can never add more than 1 at a time in that column (ten shillings) by the action of the numeral keys. If the operator makes a mistake and prints a 3 in the tens columns, it has no effect on the adding mechanism and he can correct the error on the paper and proceed with the work.

We will try one more example. Assuming that 19 appears on the two shillings wheels and 19 more is to be added thereto, which is the highest amount of shillings that can ever be properly added, 9 will be transferred to wheel $s^2$, making 8 appear thereon, and 1 to wheel $s^1$, so that the latter wheel would show blank at the sight opening on the completion of the forward movement of the handle. The carrying wheels for both wheel $s^1$ and wheel $s^2$ were, however, displaced during this movement, and on the backward movement of the handle, said wheel $s^1$ and the units wheel for £ will each be rotated one step, and one (1) will again appear on wheel $s^1$, and 1 on the units wheel for £, the total now reading 1£. 18s. I believe this action is now fully understood and we will proceed to the pence wheel.

After the numeral representing the units of shillings has been printed, selector $f$ will be under a selecting lever $g$ (Hart's case) coöperating with the punctuation space key locking devices, and before a numeral key can be depressed, a punctuation mark must be printed, or the space bar of the typewriter operated once, to cause the typewriter carriage to move one step to the left, when selector $f$ will be under lever $f^1$, coöperating with register bar $c^{70}$ having only one units pin $c^{72}$.

We will now add 11 d.
and 9 3/4d.

Total 1. 8 3/4

When the selector $f$ is in the position it occupies immediately after the punctuation mark between shillings and pence has been printed, the numeral key bearing the numeral 1 is struck, thereby oscillating its connecting rock-shaft $b^5$, and through the arm $s^{38}$ communicates motion to lever $s^{40}$, "setting" pin $c^{72}$ representing 10 in bar $c^{70}$. As there is no other pin in said bar $s^{70}$, the action of the setting bar $b^7$, connected with the rock-shaft $b^5$, has no effect this time, the typewriter carriage escapes one step, causing register bars $c^{73}$ and $c^{71}$ to be simultaneously raised by the wide lug $f^{29'}$ (on one of the transposing bars $f^{23}$) underlying said register bars. Bar $c^{73}$ has only one units pin, representing 1, and bar $c^{71}$ has eight pins, representing 2 to 9 inclusive. The numeral key representing 1 is again depressed, which "sets" the units pin in bar $c^{73}$, by the regular setting bar $b^7$, and as there is not any 1 pin in bar $c^{71}$, no pin is "set" in that bar. The operation of the numeral key bearing numeral 1 twice causes 11 to be printed on the paper. The operating handle is now oscillated and bar $c^{70}$ causes pence wheel $s^4$ to rotate 10 spaces on the forward movement of the handle, and as the handle is nearing the end of its forward movement, the other bar $c^{73}$ is picked up and moved a short distance forward, during which movement, it pushes against arm $s^{25}$ of lever $s^{17}$, until the free end of pawl $s^{19}$ falls in behind the tooth on ratchet wheel $s^6$ on which the pawl normally rests. When the handle is moved backward, the spring $s^{22}$, which was compressed during the forward movement, exerts sufficient pressure against arm $s^{20}$, of lever $s^{17}$, to cause pawl $s^{19}$ to rotate ratchet wheel $s^6$ one space, and as said ratchet wheel is rigidly attached to the double rimmed wheel $s^4$, the latter also moves one space, so that the number 11 is registered thereon. It is here noted that the rotation of one space of wheel $s^4$ on the initial backward movement of the handle, takes place before the segments $a^{15}$ on shaft $a^{14}$, commence to operate on their corresponding carriage wheels $a^9$. It will thus be seen that the "setting" of pin $c^{72}$ in bar $c^{70}$, causes a registration of 10, and the "setting" of the pin in bar $c^{73}$, causes a registration of 1, and when both pins are "set", as above described, they cause a registration of 11, both registrations controlled by the numeral key 1. We will now add 9 3/4 to the 11, already appearing on the paper and the pence wheel. The typewriter carriage is positioned so that the 9 will be printed in the units pence column, when selector $f$ again causes register bars $c^{73}$ and $c^{71}$ to be raised up as before; the key representing 9 is struck, "setting" the rear pin in bar $c^{71}$ by the regular setting bar $b^7$ connected with the 9 key; and as there is only one pin representing 1, in the other bar $c^{73}$, only one pin is "set" in the two bars. After striking the 9 key, the typewriter carriage escapes one step, lifting up the last register bar $c^{74}$, in which there are only three pins, representing the fractions 1/4, 1/2 and 3/4, and the numeral key representing 3/4 and also 3, is struck, "setting" the rearmost pin, representing 3/4 but as there are two types on the type bar operated by said key, viz., 3 and 3/4, it is necessary to depress the case-shift key 6 and holding it depressed in the usual manner for printing upper case characters, while the key is being struck, in order that the upper case character 3/4 may be printed on the paper. The depression of shift key 6, however, removes selector $f$ from its connecting lever $f^1$, to a position shown by dotted lines in Fig. 1, so that the register bar $c^{74}$ would fall down and remove the units pins in said bar from the position in which they can be reached by their respective setting bars. To hold said bar $c^{74}$ in its upper position, while the shift key is depressed, the latch arm $s^{29}$ on rock-shaft $s^{28}$, is provided as already described. When the typewriter carriage escapes from the pence units column to the fractional column, the selector $f$ raises bar $c^{74}$ to the position shown by dotted lines in Fig. 1, and latch arm $s^{29}$, under stress of spring $s^{32}$, snaps in under the rear end of bar $c^{74}$ and holds it there while the shift key 6 is depressed and the character 3/4 is printed. When the carriage again escapes one step, and on letting shift key 6 return to normal position, the selector $f$ comes in contact with the last selecting lever $f^1$ to the left, depressing its connecting rod $f^{15}$ which operates lower lever $s^{33}$, the forward end of which operates on the lower edge of rocking blade $s^{30}$, lifting it up and turning rock-shaft $s^{28}$ in a direction contrary to its movement under the action of its spring $s^{32}$, thereby causing the free end of latch arm $s^{29}$ to be withdrawn from the bar $c^{74}$, when the latter falls down to normal position. The handle is operated and 9 is transferred to the pence units wheel $s^4$ and 3/4 to the farthings wheel $s^5$. We had 11 on the wheel $s^4$, and 9 added thereto makes 20 pence; but as 12 pence make 1 shilling, the transfer, or carrying devices, cause 1 to appear on the units shillings wheel which is equal to 12 pence, leaving 8 on the pence wheel $s^4$, and wheel $s^5$ shows 3/4 at the sight opening, so that the total reads as follows: 1s. 8 3/4 d.

When 3/4 appears on the farthings wheel and more is added thereto, the carrying mechanism will transfer 1 to the pence wheel in a manner generally well understood by those familiar with this art.

Contingencies may arise, especially when errors need to be corrected, which might leave bar $c^{74}$ in its upper position at a time when the handle is oscillated, and if it had one of its pins "set" the driving bar of the adding machine carriage, would not catch any such "set" pin, and the registration on farthings wheel $s^5$ would not be correct. To prevent any such thing happening the cam arm $s^{34}$, a rock-shaft $s^{28}$ is provided. Said cam arm $s^{34}$ is in the same plane as the arm $t^{22}$ on rock-shaft $t^{23}$, the latter always being rocked when the handle is operated, through means described in said Hart patent, causing the free end of arm $t^{22}$ to move downward and against the cam arm $s^{34}$, pushing the latter rearward far enough to release latch arm $s^{29}$ from bar $c^{74}$, letting the latter fall down in time for its "set" pin to be caught by the operating carriage driving bar. The question may arise as to why I have two bars virtually acting as one, when one bar with nine pins might apparently do the same thing. The reason is this: With an ordinary bar with nine pins, I would be unable to register 11 because when the handle was nearing the end of its forward movement, it would cause the two bars to act simultaneously on one wheel and only the action of the bar $c^{70}$ would affect the rotation of the wheel, hence, it was necessary that the rotation of one space should be made on the return of the handle, but as bar $c^{73}$ is adapted to rotate the wheel, only one space at a time, it was necessary to put in a third bar, $c^{71}$, to rotate the wheel so as to register units from 2 to 9, inclusive.

Summed up briefly, the pence wheel has three register bars connected to it. Bar $c^{70}$, when pin $c^{72}$ is "set," will always cause a registration of 10; bar $c^{73}$ can only cause a registration of 1, but when both bars are used together, they will cause a registration of 11; and bar $c^{71}$ will cause a variable registration corresponding to the value of the pin that may be "set."

The following is a specimen of work done on this machine:

| £ | s. | d. |
|---|---|---|
| 123 | 19 | 11 |
| 23 | 4 | 7 3/4 |
| 1 | 12 | 10 |
| 37 | 16 | 9 1/4 |
| 375 | 10 | 1 1/2 |
| 31 | 17 | 11 |
| 10 | 4 | 7 1/2 |
| 321 | 7 | 8 |
| 28 | 5 | 10 1/2 |
| 954 | | 4 1/2 |

From the statements above, it will clearly appear that some of the register keys, such as the pounds, units of shillings, and pence wheels, are under control of all of the keys, because any amounts from 1 to 9 can be properly registered thereon; but that the tens of shillings wheel is under control of the "numeral 1" key only, because that is the highest amount that can be properly registered on said wheel at a single actuation thereof. Similarly, the fractional pence or farthings wheel is under control only of the "1," "2," and "3" keys, which also carry the symbols "1/4," "1/2," and "3/4," respectively, the latter being the highest amount that can be properly registered on said farthings wheel.

Variations may be resorted to within the scope of the invention, and portions of the improvements may be used without others.

What I claim is:

1. In a computing machine, the combination with computing wheels, of a plurality of actuators for one of said wheels, means for controlling the movement of one of said actuators to give said wheel ten steps of movement, and means for controlling the other of said actuators to give said wheel differential movements less than ten steps.

2. In a machine for computing English currency, the combination with a register including a pence wheel, of a plurality of actuators for said wheel, one of said actuators moving said wheel ten steps, another of said actuators moving said wheel different amounts less than ten steps, a single key for controlling said first-mentioned actuator, and a plurality of keys for controlling said second-mentioned actuator.

3. In a machine for computing English currency, the combination with a register including a pence wheel, of two pinions constituting part of said wheel, and means for engaging each of said pinions to drive said pence wheel different amounts at different times.

4. In a machine for computing English currency, the combination with a register including a pence wheel, of a pinion forming a part of said wheel, a ratchet also forming a part thereof, means coöperating with said pinion to drive said pence wheel different amounts, and means coöperating with said ratchet to drive said pence wheel a single step of movement.

5. In a machine for computing English currency, the combination with a register including a pence wheel and carrying mechanism therefor, of a ratchet wheel forming a part of said wheel, a pawl coöperating with said ratchet wheel to drive said pence wheel a single step of movement, and a key to determine when said pawl shall be effective.

6. In a machine for computing English currency, the combination with a register including a pence wheel, of duplex actuating means for said pence wheel, a motor for one of said actuating means, a general operator, and means controlled thereby for moving one of said actuating means to drive said pence wheel on the forward stroke of said general operator, and supplying power to said motor, said general operator also enabling said motor to drive said pence wheel on the return stroke of said general operator.

7. In a machine for computing English currency, the combination with a register including a pence wheel, said wheel having two pinions and a ratchet formed thereon, of means coöperating with one pinion for advancing said pence wheel ten steps, means coöperating with the other pinion for differentially advancing said pence wheel less than ten steps, and means coöperating with said ratchet for advancing said pence wheel solely one step.

8. In a machine for computing English currency, the combination with a register including a pence wheel, of duplex actuating means for said wheel, a motor for one of said actuating means, means for concomitantly driving said pence wheel ten steps and supplying power to said motor, and means for subsequently permitting said motor to act to drive said pence wheel an extra step.

9. In a computing machine, the combination with a register having a plurality of register wheels, one of which is marked to register more than nine units, of a series of actuators for engaging said wheel, one of said actuators arranged to move said wheel one unit, another ten units, and another different distances less than ten units, and keys for controlling said actuators.

10. In a computing machine, the combination with a register having a plurality of register wheels, one of which is marked to register more than nine units, of an actuator for causing the registration of tens on said wheel, a plurality of actuators for causing registration of units on said wheel, keys for controlling all of said actuators, and means for shifting the action of said keys from the tens actuator to the units actuators.

11. In a computing machine, the combination with a register comprising groups of wheels representing different denominations, both decimal and non-decimal, one of said wheels marked to register more than nine units of a certain denomination, of a series of actuators for said wheel, one of said actuators moving said wheel ten steps, another actuator moving said wheel from two to nine steps, and another actuator moving said wheel one step, a series of numeral keys corresponding to the digits 1 to 9, inclusive, means whereby said keys from 2 to 9 may control said wheel to register corresponding amounts thereon, and means whereby the numeral key denoting one unit may control the operation of one or a plurality of said actuators to register on said wheel one, ten or eleven units at will.

12. In a computing machine, the combination with a register, of a step-by-step moving carriage, numeral keys controlling said carriage, register bars for actuating said register, said register bars being normally out of the range of action of said numeral keys, transposition bars for moving said register bars one after another to position to be acted on by said keys as said carriage moves step by step, and means on one of said transposition bars for acting on two of said register bars simultaneously.

13. In a computing machine, the combination with a register, of a step-by-step moving carriage, numeral keys controlling said carriage, register bars for actuating said register, said register bars being normally out of the range of action of said numeral keys, transposition bars, lugs on some of said transposition bars for engaging and moving said register bars one after another to position to be acted on by said keys as said carriage moves step by step, and a broad lug on one of said transposition bars for engaging two of said register bars simultaneously.

14. The combination with a typewriter having a case-shift key, of a denominational order selector under control of said shift key, a series of numeral keys, register bars, means connecting said register bars and denominational order selector for presenting the register bars in succession to the action of said numeral keys when the case-shift key is in normal position, said connecting means being actuated by said selector, and means for holding one of said register bars in the position in which it is subject to the keys, after the denominational order selector has been removed from its operative selecting position by the operation of said case-shift key.

15. The combination with a typewriter having a case-shift key, of a denominational order selector under control of said shift key, a series of numeral keys, register bars, means connecting said register bars and denominational order selector for presenting the register bars in succession to the action of said numeral keys when the case-shift key is in normal position, and a spring-actuated latch which snaps in under the rear end of one of said register bars and holds it in the position in which it is subject to the keys, after the denominational order selector has been removed from its operative selecting position, by the operation of said case-shift key.

16. The combination with a denominational order selector, of a series of keys, register bars, unit pins carried thereby, means for presenting said register bars to the action of said keys by the said selector, means for holding one of said bars in a position in which it is subject to the key action after the selector has been removed from its operative selecting position, a key for correction of errors, and means controlled by said key for releasing said register bar from the position in which it is subject to the action of said numeral keys, whereby any erroneously "set" unit pin in said bar may be restored to normal position by the action of said error key.

17. In a combined typewriting and computing machine, the combination with a typewriting mechanism having a case-shift, of a register, a series of register bars controlling said register, a series of numeral keys for determining amounts of movement of said register bars, said register bars being normally in position out of range of control by said numeral keys, a denominational-order-selector for presenting the register bars in succession to the keys, and means operable to render said denominational selector ineffective on all but one of said register bars when the case is shifted.

18. The combination with a register wheel for registering farthings or fractional pence, of three numeral keys denoting values of 1/4, 1/2 and 3/4, respectively, a register bar operative on said wheel, a series of three unit pins in said bar representing said fractional values, and other numeral keys denoting other values than 1/4, 1/2 and 3/4, which have no controlling influence over said register bar in its operative connection with said register wheel.

19. In a combined typewriting and computing machine, the combination with a typewriter carriage, of a register having order wheels, numeral keys for controlling said register, case-shifting mechanism, means for effecting denominational selection of one of said order wheels under control of said carriage solely while said case-shifting mechanism is in one position, means for determining the amount of movement of said selected wheel and means enabling said determining means to act when said case-shifting mechanism is in another position.

20. In a combined typewriting and computing machine, the combination with a register having order wheels, of actuators for said wheels, numeral keys for printing both upper and lower-case numerals, said actuators normally in position to be unaffected by said keys, and means to enable said keys to determine the amount of movement of the actuator for one of said wheels, when said keys act to print upper-case numerals.

21. In a computing machine for computing English currency, the combination with a register having a fraction of a pence wheel, of an actuator for said wheel, keys for determining the amount of movement of said actuator, said actuator normally in position to be unaffected by said keys, means for moving said actuator to position to enable said keys to determine the amount of movement thereof, means for latching said actuator in its active position, an error key, and means controlled by the error key for releasing said latching means.

22. In a computing machine for computing English currency, the combination with a register having a fraction of a pence wheel, of an actuator for said wheel, keys for determining the amount of movement of said actuator, said actuator normally in position to be unaffected by said keys, means for moving said actuator to position to enable said keys to determine the amount of movement thereof, a general operator for moving the actuator to drive the register, means for latching said actuator in its active position, and means controlled by said general operator for releasing said latching means.

23. In a combined typewriting and computing machine for computing English currency, the combination with a typewriter carriage, of a register having wheels of different denominations, including a fraction of a pence wheel, an actuator for said wheel, keys for determining the amount of movement of said actuator, said actuator normally in position to be unaffected by said keys, means controlled by said carriage on reaching the denomination corresponding to said fraction of pence wheel, for moving said actuator to position to enable said keys to determine the amount of movement thereof, means for latching said actuator in its active position, and means controlled by said carriage on moving to the next denominational column, for releasing said latching means.

24. In a combined typewriting and computing machine for computing English currency, the combination with a typewriter carriage, of a register having wheels of different denominations, including a fraction of a pence wheel, an actuator for said wheel, keys for determining the amount of movement of said actuator, said actuator normally in position to be unaffected by said keys, means controlled by said carriage on reaching the denomination corresponding to said fraction of pence wheel, for moving said actuator to position to enable said keys to determine the amount of movement thereof, means for holding said actuator in its active position, and means controlled by the carriage when in any other denominational order of said register, for releasing said actuator.

25. In a computing machine, the combination with a register, of a series of actuators therefor, a denominational-order-selector, means controlled thereby for moving said actuators *seriatim* to thereby determine the effectiveness of said actuators on said register, means for holding one of said actuators in the position to which it is moved, and means for releasing said actuator when said denominational selector acts to control any other actuator.

26. In a computing machine, the combination with a register, of actuators therefor, denominational members for moving said actuators to thereby determine the effectiveness of said actuators on said register, a latch for holding one of said actuators in the effective position to which it is moved by its corresponding denominational member, and means universal to all the remaining denominational members for releasing said latch.

27. In a computing machine, the combination with a register, of actuators therefor, denominational members for moving said actuators to thereby determine the effectiveness of said actuators on said register, a latch for holding one of said actuators in the effective position to which it is moved by its corresponding denominational member, and means universal to all the remaining denominational members for releasing said latch, said means comprising a bail movable with said latch, said bail engaged by all of the denominational members except the one in the order corresponding to that of one of said actuators.

28. In a computing machine, the combination with a register made up of wheels, one of which is marked and arranged to register more than 9, of three register bars equipped with unit pins and coöperating with the said noted register wheel, the pins in said three bars representing different units or amounts, key-controlled means for setting the unit pins, and means for rendering the said register bars individually operative on the said register wheel and for causing several thereof to operate said register wheel under a single movement of the register actuating devices.

29. In a combined typewriting and computing machine, the combination with a traveling carriage, typewriter numeral keys and a case-shift mechanism, of a computing element normally ineffective when the case-shift mechanism is effective, a second computing element normally ineffective but adapted to be effective even though the case-shift mechanism is effective, an escapement mechanism for said carriage, and connections whereby the feeding of said carriage by its escapement mechanism out of the computing zone, restores said last-named computing element to its normal ineffective condition.

30. In a combined typewriting and computing machine, the combination with a traveling carriage, typewriter numeral keys and a case-shift mechanism, of a normally ineffective computing device, means for holding said computing device effective when the case-shift mechanism is effective, a latch for holding it so effective, means operated by the movement of the carriage out of the computing zone for releasing said latch to make said computing device ineffective, and another computing device under the control of said same keys adapted to be made ineffective by the operation of said case-shift mechanism.

31. The combination with a typewriting machine including numeral keys and a case-shifting mechanism enabling the writing of numeral characters non-decimally in upper and decimally in lower-case, of computing mechanism controlled by said keys and capable of computing both decimally and non-decimally, and means whereby the shifting to upper-case may lock an element of said computing mechanism in effective position to cause non-decimal computation corresponding to the change in printing by said keys to upper from lower-case.

32. In a computing machine, the combination with a register having numeral wheels, of means for rotating said numeral wheels from diverse positions so that each occupies a definite position, one of said wheels having a plurality of carrying lugs, and a carrying wheel adapted to be engaged and moved by a lug, said wheel being so constructed that a second lug will not engage and move said carrying wheel after one lug has moved said wheel.

33. In a computing machine, the combination with a register having a plurality of numeral wheels, of carrying mechanism for said wheels, including carrying wheels having sets of teeth arranged in pairs, and a carrying lug on each numeral wheel to engage and move its associated carrying wheel by engaging one tooth of a pair of teeth on said carrying wheel, one of said numeral wheels having a plurality of lugs, and one of the teeth of each pair of teeth on the carrying wheel being cut away in the plane of movement of the said carrying lugs, to enable subsequent lugs to pass idly by said carrying wheel after said carrying wheel has been moved by one of said lugs.

34. In a computing machine, the combination with a register including a plurality of numeral wheels, of means for carrying from one wheel to another, including carrying wheels, each of said carrying wheels having a pair of teeth thereon, one of said numeral wheels having a plurality of carrying lugs to engage one tooth of said pair of teeth of its associated carrying wheel to initiate a carrying operation, means for rotating said numeral wheels from diverse positions so that each occupies a definite position, and means for permitting any of said carrying lugs to pass one tooth of any of said pairs of teeth without operating said carrying wheel after said wheel has been moved to initiate a carrying operation when said digit wheels are thus rotated.

35. In a combined typewriting and computing machine, the combination with numeral keys and a traveling carriage, of computing wheels, devices whereby said wheels, in being selected by said carriage, compute numbers determined by the numeral keys operated, case-shift mechanism, and means whereby, when said carriage is effective to select a wheel and the case-shift mechanism is simultaneously effective, said wheel is effective to compute numbers other than those normally computed by said keys.

36. In a combined typewriting and computing machine, the combination with numeral keys and a traveling carriage, of computing wheels, denominational bars for said wheels selected by said carriage, means whereby each key determines on the effective denominational bar the number to be computed, case-shift mechanism, comprising connections to affect at least one bar, and means whereby, when said case-shift mechanism and said carriage are simultaneously effective on a bar, a depressed key is effective to determine a number other than that normally computed by said key.

37. In a combined typewriting and computing machine, the combination with numeral keys and a traveling carriage, of computing wheels, denominational bars for said wheels selected by said carriage, pins settable on said denominational bars by said keys to set up the numbers to be computed, case-shift mechanism, comprising connections to affect at least one bar, and means whereby, when said carriage and said case-shift mechanism are simultaneously effective to select a bar, the pins on said bar are effective to compute numbers other than those normally computed by the corresponding pins on other bars.

In testimony whereof I affix my signature in presence of two witnesses.

HANS HANSON.

Witnesses:
W. M. DYORKMAN,
FRANK A. COOK.

Copies of this patent may be obtained for five cents each, by addressing the "Commissioner of Patents, Washington, D. C."